United States Patent
Shimizu et al.

(10) Patent No.: US 6,844,033 B2
(45) Date of Patent: Jan. 18, 2005

(54) CELLULOSE ESTER FILM, ITS MANUFACTURING METHOD, POLARIZING PLATE, AND LIQUID CRYSTAL DISPLAY

(75) Inventors: Kunio Shimizu, Hino (JP); Takashi Murakami, Hino (JP); Toru Kobayashi, Hino (JP)

(73) Assignee: Konica Corporation (JP)

( * ) Notice: Subject to any disclaimer, the term of this patent is extended or adjusted under 35 U.S.C. 154(b) by 246 days.

(21) Appl. No.: 10/075,362

(22) Filed: Feb. 14, 2002

(65) Prior Publication Data

US 2002/0162483 A1 Nov. 7, 2002

(30) Foreign Application Priority Data

Mar. 1, 2001 (JP) ........................................ 2001-056648

(51) Int. Cl.[7] ............................................. C09K 19/00
(52) U.S. Cl. ..................................... 428/1.33; 428/1.31
(58) Field of Search ............................. 428/1.31–1.33; 106/137.7, 168.01, 137.71; 524/41, 297; 264/211; 508/478–479, 482–484

(56) References Cited

U.S. PATENT DOCUMENTS

| | | | | |
|---|---|---|---|---|
| 2,038,114 A | * | 4/1936 | Joseph ........................ | 252/589 |
| 2,364,112 A | * | 12/1944 | Van Every .................. | 252/589 |
| 2,412,611 A | * | 12/1946 | Gloor ...................... | 106/170.31 |
| 3,391,296 A | * | 7/1968 | Snaper ....................... | 313/465 |
| 4,544,583 A | * | 10/1985 | Claussen et al. ............. | 428/1.5 |
| 5,806,834 A | * | 9/1998 | Yoshida ....................... | 252/589 |

OTHER PUBLICATIONS

Morflex, Inc., Morflex 150, 1999.*

* cited by examiner

*Primary Examiner*—Harold Pyon
*Assistant Examiner*—Sow-Fun Hon
(74) *Attorney, Agent, or Firm*—Muserlian, Lucas and Mercanti

(57) ABSTRACT

A cellulose ester film and its manufacturing method are disclosed, the cellulose ester film comprising a compound represented by the following formula (1) in an amount of from 1 to 30% by weight,

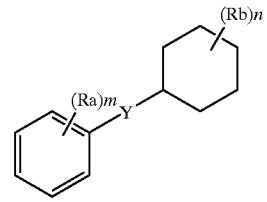

formula (1)

wherein Y represents an ester bond or a divalent organic group containing an ester bond, RTA and Rd independently represent a substituent, and m and n independently represent an integer of 0 to 5, provided that when m or n is not less than 2, plural Ras or Rbs may be the same or different.

16 Claims, 1 Drawing Sheet

CELLULOSE ESTER FILM, ITS MANUFACTURING METHOD, POLARIZING PLATE, AND LIQUID CRYSTAL DISPLAY

FIELD OF THE INVENTION

The present invention relates to a cellulose ester film and its manufacturing method, and particularly to a cellulose ester film useful for a protective film of polarizing plate, and a polarizing plate and a liquid crystal display each employing the cellulose ester film.

BACKGROUND OF THE INVENTION

Recently, development has been made regarding decrease in thickness and weight of a note board type personal computer. In parallel with this development, a polarizing plate used in a device such a liquid crystal display or an organic EL display has been eagerly sought to be increasingly thinner. Particularly, decrease in thickness of a protective film of a polarizing plate has been strongly required. However, it has been proved that a simple decrease in thickness of the polarizing plate protective film produces various problems. One of the problems regards moisture vapor permeation (moisture vapor transmittance). For example, as the thickness of a polarizing plate protective film decreases, the moisture vapor transmittance of the film becomes higher, resulting in lowering of durability of the polarizing plate. There have been proposed several methods in which moisture vapor transmittance is optimized. A film with a lower moisture vapor transmittance improves durability of a polarizing plate employing the film, however, too low moisture vapor transmittance has a defect in that an adhesive is difficult to be dried which is used to adhere a polarizing plate protective film to a polarizing film.

Therefore, a polarizing plate protective film with moisture vapor permeation property satisfying both the durability and the drying property is required. A cellulose ester film is used in most of polarizing plate protective films, and moisture vapor transmittance of the polarizing plate protective film employing the cellulose ester film is markedly deteriorated due to decrease in thickness. It is known that the high content of a plasticizer in the polarizing plate protective film improves a moisture vapor transmittance, however, a too high content of the plasticizer in the film causes problem of lowering dimensional stability of the film. A polarizing plate protective film having an excellent moisture vapor permeation property and an excellent film performance is required.

SUMMARY OF THE INVENTION

The present invention has been made in view of the above. An object of the invention is to provide a cellulose ester film having an excellent moisture vapor transmittance and excellent dimensional stability and a manufacturing method thereof. Another object of the invention is to provide a cellulose ester film having excellent resistance to high temperature and high humidity and excellent UV light fastness, which is suitable for a polarizing plate protective film and a polarizing plate and a liquid crystal display each employing the film.

DETAILED DESCRIPTION OF THE INVENTION

Figure 1:
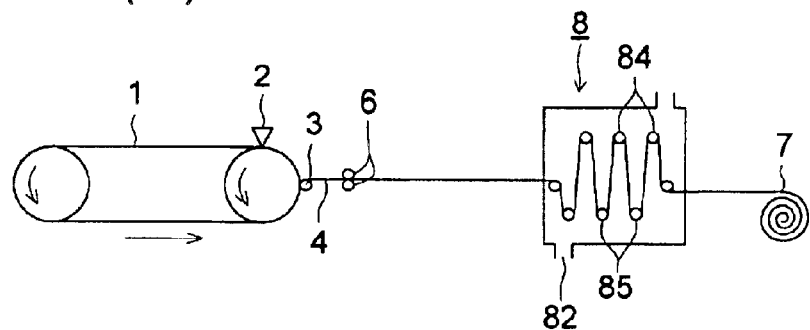
FIG. 1(a) is a schematic view showing a first embodiment of a solution cast film manufacture process.
FIG. 1(b) is a schematic view showing a second embodiment of a solution cast film manufacture process.
FIG. 1(c) is a schematic view showing a third embodiment of a solution cast film manufacture process.
FIG. 1(d) is a schematic view showing a fourth embodiment of a solution cast film manufacture process.
Figure 1:
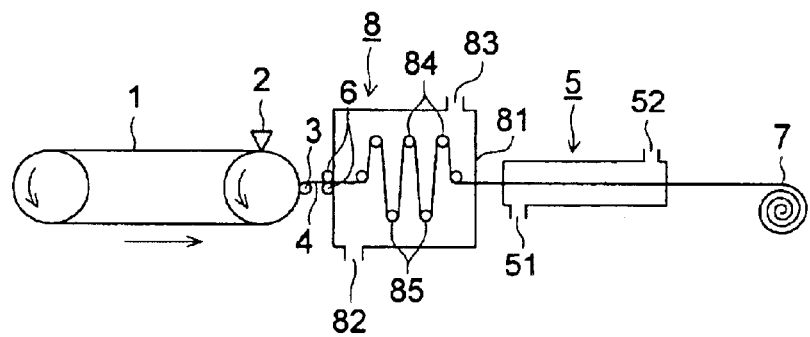
Figure 1:
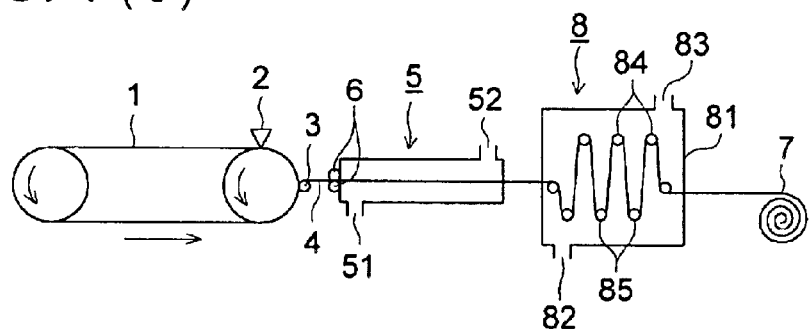
Figure 1:
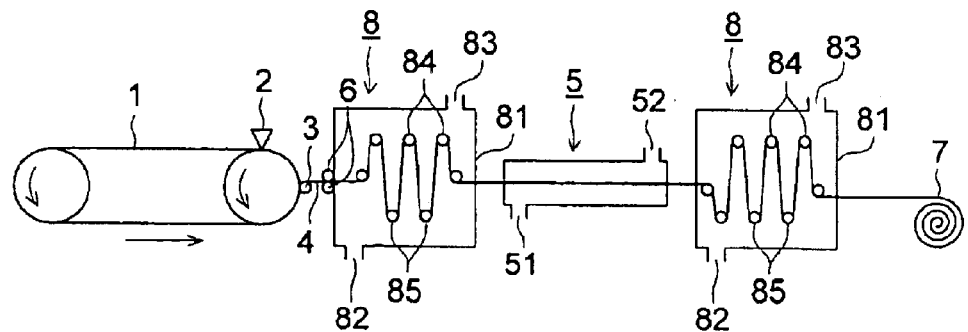

The present invention can be attained by the following constitutions:

1. A cellulose ester film comprising a compound represented by the following formula (1) in an amount of 1 to 30% by weight

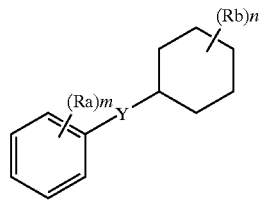

formula (1)

wherein Y represents an ester bond or a divalent organic group containing an ester bond, Ra and Rb independently represent a substituent, and m and n independently represent an integer of from 0 to 5, provided that when m or n is not less than 2, plural Ras or Rbs may be the same or different.

2. The cellulose ester film of item 1, wherein the divalent organic group containing an ester bond represented by Y represents —$R^1C(=O)O$—; —$C(=O)OR^2$—; —$C(=O)O$—$R^3$—$OC(=O)$—; or —$OC(=O)$—$R^4$—$C(=O)O$—, in which $R^1$ and $R^2$ independently represent a substituted or unsubstituted alkylene group, and $R^3$ and $R^4$ independently represent a substituted or unsubstituted alkylene group, or —$(R^5O)_pR^5$—, in which $R^5$ represents a substituted or unsubstituted alkylene group, and p is an integer of from 1 to 3; the substituent represented by Ra or Rb is an alkyl group, RcC(=O)O— or —C(=O)ORc in which Rc represents a substituted or unsubstituted phenyl group or a substituted or unsubstituted cyclohexyl group, and m and n independently represent an integer of from 0 to 5, provided that when m or n is not less than 2, plural Ras or Rbs may be the same or different.

3. The cellulose ester film of item 2, wherein the unsubstituted alkylene group represented by $R^1$, $R^2$, $R^3$, $R^4$ or $R^5$ represents methylene, ethylene, trimethylene, propylene, tetramethylene, butylene, pentamethylene, or pentylene, and the substituted alkylene group represented by $R^1$, $R^2$, $R^3$, $R^4$ or $R^5$ represents methylene, ethylene, trimethylene, propylene, tetramethylene, butylene, pentamethylene, or pentylene, each having methyl, ethyl, n- or iso-propyl, n-, iso-, or tert-butyl, acetoxy, phenylcarbonyloxy, cyclohexylcarbonyloxy, phenylcarbonyloxymethyl or cyclohexylcarbonyloxymethyl as a substituent.

4. The cellulose ester film of item 2, wherein the substituent represented by Ra or Rb is RcC(=O)O— or —C(=O)ORc in which Rc represents a substituted or unsubstituted phenyl group or a substituted or unsubstituted cyclohexyl group, and m represents an integer of from 1 to 5.

5. The cellulose ester film of item 2, wherein the substituent represented by Ra or Rb is RcC(=O)O— or —C(=O)ORc in which Rc represents a substituted or unsubstituted phenyl group or a substituted or unsubstituted cyclohexyl group, and n represents an integer of from 1 to 5.

6. The cellulose ester film of item 2, wherein Ra is RcC(=O)O— or —C(=O)ORc in which Rc represents a substituted or unsubstituted cyclohexyl group, and m represents an integer of from 1 to 5.

7. The cellulose ester film of item 1, wherein the cellulose ester film comprises a UV absorbent having a distribution coefficient of not less than 8.5.

8. The cellulose ester film of item 1, wherein the cellulose ester film comprises silicon oxide particles.

9. The cellulose ester film of item 1, wherein the cellulose ester film comprises a cellulose ester having a total acyl substitution degree of from 2.55 to 2.85.

10. The cellulose ester film of item 1, wherein the cellulose ester film has a thickness of from 10 to 60 μm, a moisture vapor transmittance of from 20 to 200 g/m²·24 hr, and a rate of weight change falling within the range of ±2% in which the rate is represented by the ratio of the difference between the film weights before and after storage at 80° C. and 90% RH for 48 hours to the film weight before the storage.

11. A method of manufacturing a cellulose ester film according to a solution cast film manufacturing process, the method comprising the steps of casting on a support a cellulose ester solution comprising a compound represented by formula (1) of item 1 above to form a web on the support, drying the web for 30 to 90 seconds on the support, peeling the web from the support, and further drying the peeled web.

12. The method of item 11, wherein the cellulose ester film comprises the compound in an amount of from 1 to 30% by weight.

13. The method of item 11, wherein in formula (1), the divalent organic group containing an ester bond represented by Y represents —R¹C(=O)O—; —C(=O)OR²—; —C(=O)O—R³—OC(=O)—; or —OC(=O)—R⁴—C(=O)O—, in which R¹ and R² independently represent a substituted or unsubstituted alkylene group, and R³ and R⁴ independently represent a substituted or unsubstituted alkylene group, or —(R⁵O)ₚR⁵—, in which R⁵ represents a substituted or unsubstituted alkylene group, and p is an integer of from 1 to 3; the substituent represented by Ra or Rb is an alkyl group, RcC(=O)O— or —C(=O)ORc in which Rc represents a substituted or unsubstituted phenyl group or a substituted or unsubstituted cyclohexyl group, and m and n independently represent an integer of from 0 to 5, provided that when m or n is not less than 2, plural Ras or Rbs may be the same or different.

14. The method of item 11, wherein the cellulose ester film comprises a UV absorbent having a distribution coefficient of not less than 8.5.

15. The method of item 11, wherein the cellulose ester film comprises silicon oxide particles.

16. The method of item 11, wherein the cellulose ester film comprises a cellulose ester having a total acyl substitution degree of from 2.55 to 2.85.

17. The method of item 11, wherein the cellulose ester film has a thickness of from 10 to 60 μm, a moisture vapor transmittance of from 20 to 200 g/m²·24 hr, and a rate of weight change falling within the range of ±2% in which the rate is represented by the ratio of the difference between the film weights before and after storage at 80° C. and 90% RH for 48 hours to the film weight before the storage.

18. The method of item 11, wherein the cellulose ester solution contains methyl acetate.

19. A polarizing plate comprising the cellulose ester film of item 1.

20. A liquid crystal display employing the polarizing plate of item 19.

41. A cellulose ester film comprising a compound having a structure represented by the following formula (1') in an amount of from 1 to 30% by weight,

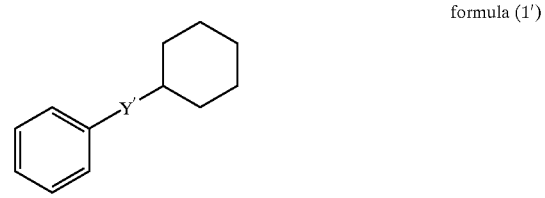

formula (1')

wherein Y' represents a divalent organic group, and at least one of the aromatic ring and the cyclohexane ring may have a substituent.

42. The cellulose ester film of item 41 above, wherein Y' in formula (1') is a divalent organic group containing an ester bond.

43. The cellulose ester film of item 41 or 42 above, wherein the cellulose ester film comprises a UV absorbent having a distribution coefficient of not less than 8.5.

44. The cellulose ester film of any one of items 41 through 43 above, wherein the cellulose ester film comprises silicon oxide particles.

45. The cellulose ester film of any one of items 41 through 44 above, wherein the cellulose ester film comprises a cellulose ester having a total substitution degree of from 2.55 to 2.85.

46. The cellulose ester film of any one of items 41 through 45 above, wherein the cellulose ester film has a thickness of from 10 to 60 μm, a moisture vapor transmittance of from 20 to 200 g/m²·24 hr, and a rate of weight change falling within the range of ±2% in which the rate is represented by the ratio of the difference between the film weights before and after storage at 80° C. and 90% RH for 48 hours to the film weight before the storage.

47. A method of manufacturing a cellulose ester film according to a solution cast film manufacturing process, the method comprising the steps of casting on a support a cellulose ester solution comprising a compound having a structure represented by formula (1') above to form a web on the support, drying the web for 30 to 90 seconds on the support, peeling the web from the support, and further drying the peeled web.

48. The method of item 47 above, wherein the cellulose ester film comprises the compound in an amount of from 1 to 30% by weight.

49. The method of items 47 or 48 above, wherein Y' in formula (1') is a divalent organic group containing an ester bond.

50. The method of any one of items 47 through 49 above, wherein the cellulose ester film comprises a UV absorbent having a distribution coefficient of not less than 8.5.

51. The method of any one of items 47 through 50 above, wherein the cellulose ester film comprises silicon oxide particles.

52. The method of any one of items 47 through 51 above, wherein the cellulose ester film comprises a cellulose ester having a total substitution degree of from 2.55 to 2.85.

53. The method of any one of items 47 through 52 above, wherein the cellulose ester film has a thickness of from 10 to 60 μm, a moisture vapor transmittance of from 20 to 200 g/m²·24 hr. and a rate of weight change falling within the range of ±2% in which the rate is represented by the ratio of the difference between the film weights before and after storage at 80° C. and 90% RH for 48 hours to the film weight before the storage.

54. The method of any one of items 47 through 53 above, wherein the cellulose ester solution contains methyl acetate.

55. A polarizing plate comprising the cellulose ester film of any one of items 41 through 46 above.

56. A liquid crystal display employing the polarizing plate of item 55 above.

The present inventors have made an extensive study in order to solve the problems described previously, and as a result, they have succeeded in obtaining a cellulose ester film which provides a satisfactory moisture vapor transmittance and an excellent dimensional stability, in spite of reduced thickness of the film, and which is useful for a polarizing plate protective film.

Next, the compound represented by formula (1) will be explained in detail.

In formula (1) above, the divalent organic group Y is an ester bond or a divalent organic group containing an ester bond. The ester bond herein referred to implies —C(=O)O—. The divalent organic group containing an ester bond represented by Y represents —R¹C(=O)O—; —C(=O)OR²—; —C(=O)O—R³—OC(=O)—; or —OC(=O)—R⁴—C(=O)O—, in which $R^1$ and $R^2$ independently represent a substituted or unsubstituted alkylene group, and $R^3$ and $R^4$ independently represent a substituted or unsubstituted alkylene group, or —(R⁵O)$_p$R⁵—, in which $R^5$ represents a substituted or unsubstituted alkylene group, and p is an integer of from 1 to 3. Examples of the unsubstituted alkylene group represented by $R^1$, $R^2$, $R^3$, $R^4$ or $R^5$ include methylene, ethylene, trimethylene, propylene, tetramethylene, butylene, pentamethylene, or pentylene. Examples of the substituted alkylene group represented by $R^1$, $R^2$, $R^3$, $R^4$ or $R^5$ include methylene, ethylene, trimethylene, propylene, tetramethylene, butylene, pentamethylene or pentylene, each having methyl, ethyl, n- or iso-propyl, n-, iso-, or tert-butyl, acetoxy, phenylcarbonyloxy, cyclohexylcarbonyloxy, phenylcarbonyloxymethyl or cyclohexylcarbonyloxymethyl as a substituent. The phenylcarbonyloxy, cyclohexylcarbonyloxy, phenylcarbonyloxymethyl or cyclohexylcarbonyloxymethyl may further have a substituent.

Ra and Rb independently represent an alkyl group, RcC(=O)O— or —C(=O)ORc in which Rc represents a substituted or unsubstituted phenyl group or a substituted or unsubstituted cyclohexyl group, and m and n independently represent an integer of 0 to 5. When m or n is not less than 2, plural Ras or Rbs may be the same or different. Examples of the alkyl group of Ra and Rb, or examples of the substituent of the substituted phenyl or cyclohexyl group of Rc include methyl, ethyl, n- or iso-propyl, or n-, iso-, or tert-butyl.

In the invention, it is preferred in the invention that the cyclohexane ring of formula (1) has a substituent (i.e., n is preferably an integer of 1 to 5).

In the invention, it is preferred in providing a good compatibility with the cellulose ester that the cyclohexane ring of formula (1) has at least one substituent, and the substituent is preferably an alkyl group.

In formula (1), it is especially preferred that Ra is RcC(=O)O— or —C(=O)ORc in which Rc represents a cyclohexyl group, and m represents an integer of 1 to 5.

In the invention, the content of the compound represented by formula (1) above in the cellulose ester film is from 1 to 30% by weight, preferably from 5 to 25% by weight, and more preferably from 10 to 20% by weight.

Next, the compound having a chemical structure represented by formula (1') will be explained in detail.

The compound has a chemical structure in which the cyclohexane ring and the aromatic ring are connected through a divalent organic group Y'. The divalent organic group is not specifically limited, but preferably has an ester bond. The cyclohexane ring and the aromatic ring may have a substituent. The substituent is not specifically limited, but is preferably an alkyl group. It is preferred in the invention that the cyclohexane ring has a substituent.

It is especially preferred in providing a good compatibility with the cellulose ester that the cyclohexane ring has at least one substituent other than hydrogen, and the substituent is preferably an alkyl group.

The compound having a chemical structure represented by formula (1') has at least one of the chemical structure in which the cyclohexane ring and the aromatic ring are connected through the divalent organic group. When the compound has two or more of the chemical structure, it is preferably a compound having a structure in which two or more of the aromatic ring are connected to the cyclohexane ring, or it may be a compound having a structure in which two or more of the cyclohexane ring are connected to the aromatic ring.

In the invention, the content of the compound having a chemical structure represented by formula (1') above in the cellulose ester film is from 1 to 30% by weight, preferably from 5 to 25% by weight, and more preferably from 10 to 20% by weight.

Examples of the compound represented by formula (1) or formula (1') will be shown below, but are not limited thereto. These compounds can be also used as a mixture of two or more kinds thereof.

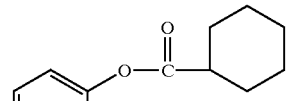

1-1

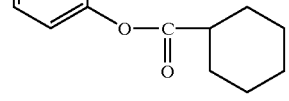

1-2

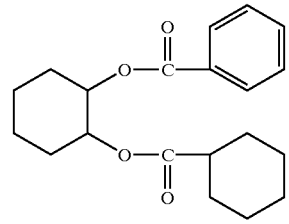

1-3

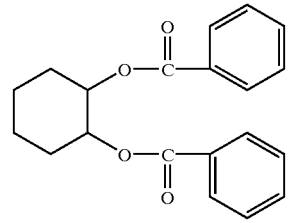

1-4
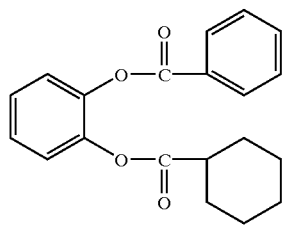
1-5
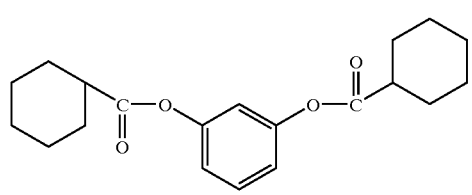
1-6
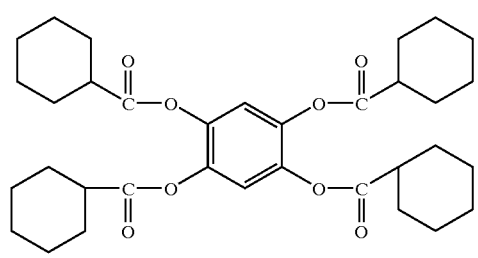
1-7
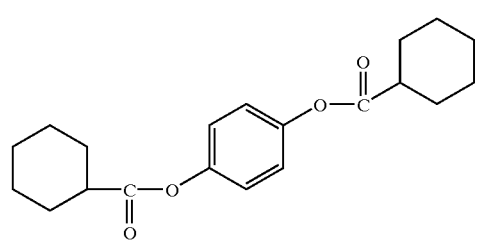
1-8
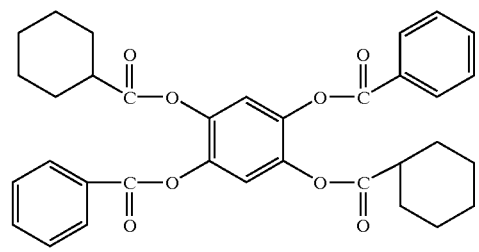
1-9
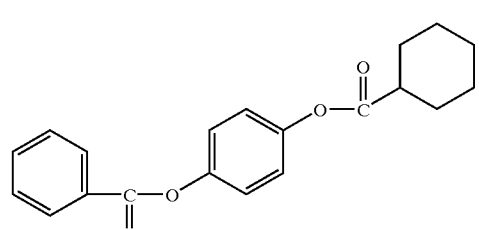
1-10
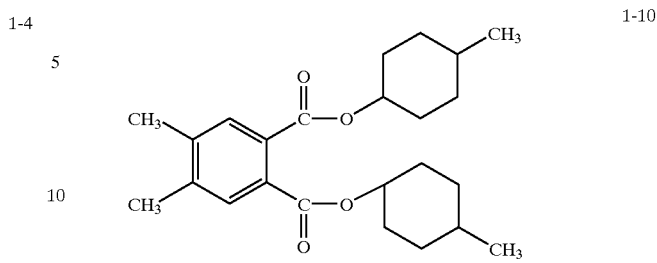
1-11
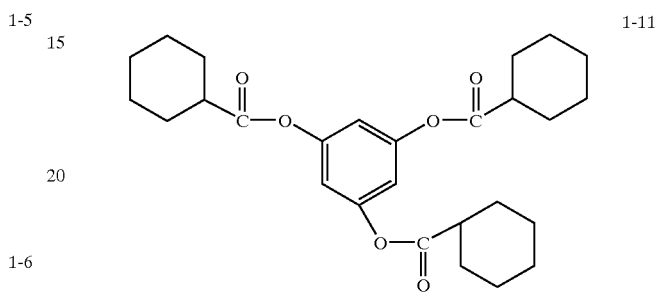
1-12
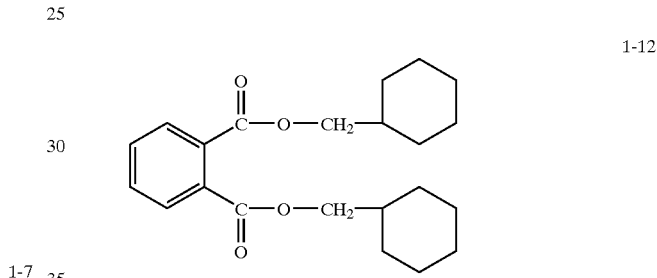
1-13
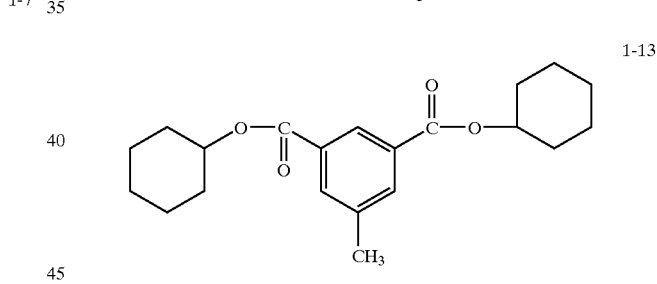
1-14
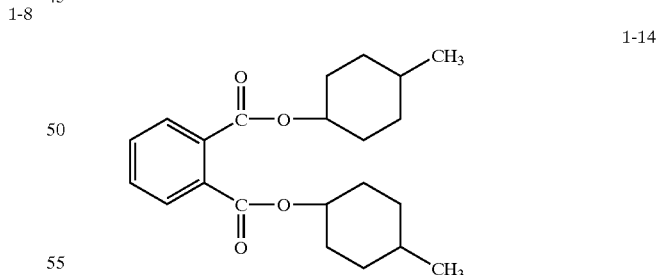
1-15
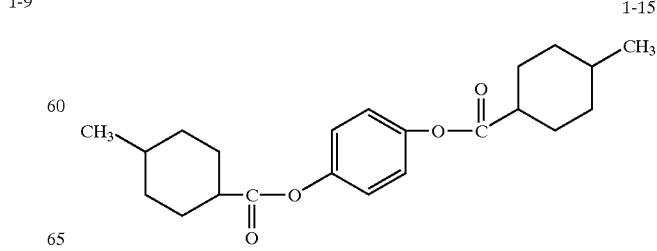

1-6
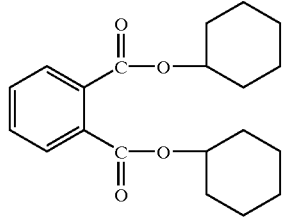
1-17
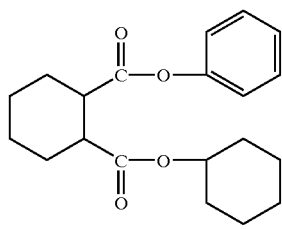
1-18
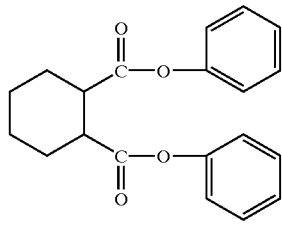
1-19
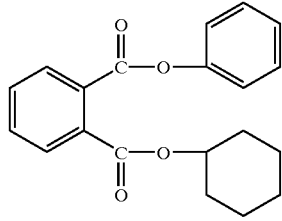
1-20
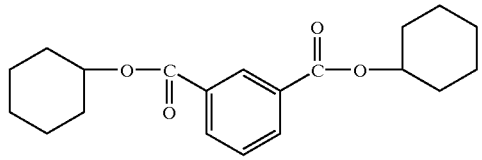
1-21
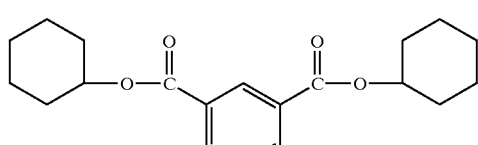
1-22
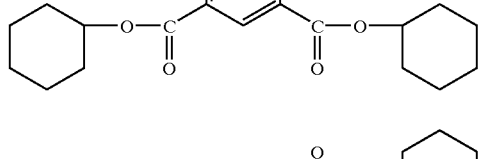
1-23
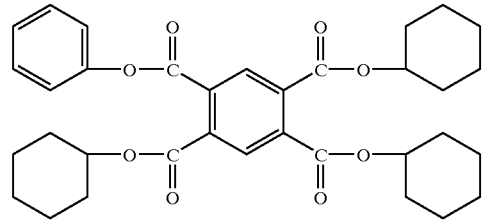
1-24
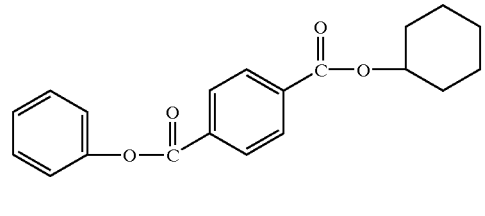
1-25
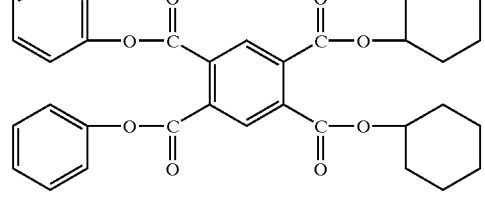
1-26
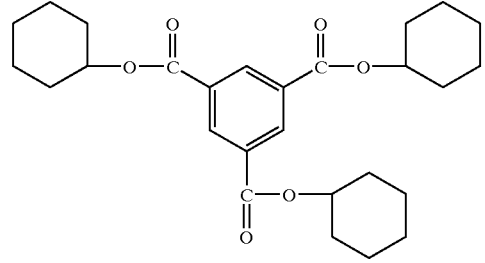
1-27
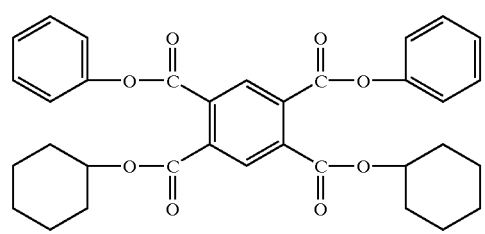
1-28
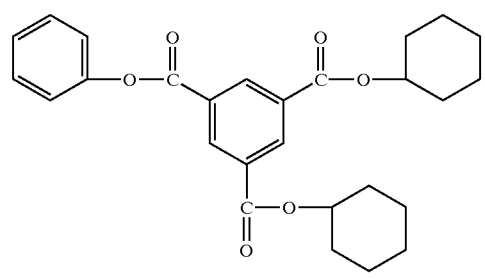

1-29
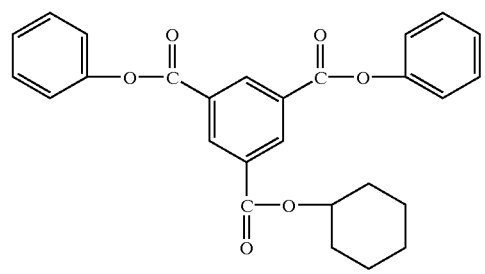
1-30
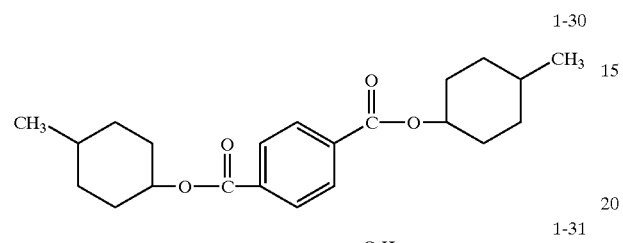
1-31
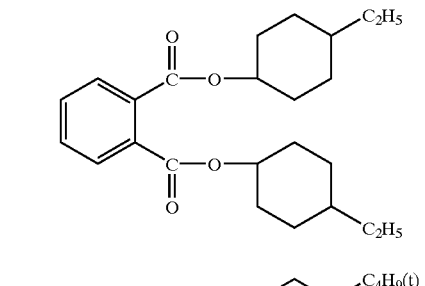
1-32
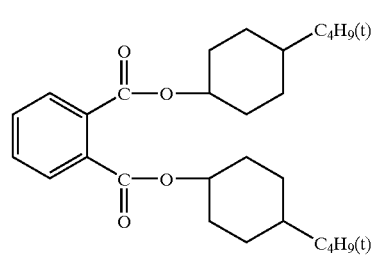
1-33
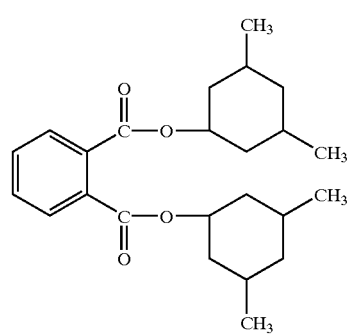
1-34
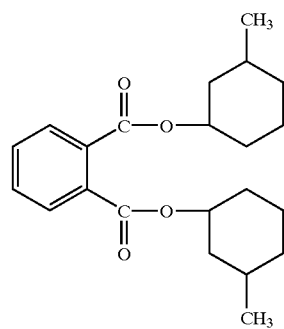
1-35
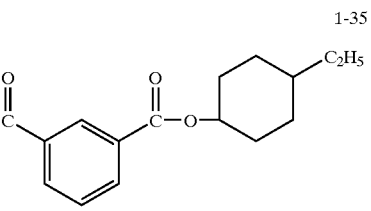
1-36
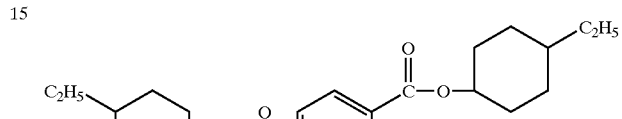
1-37
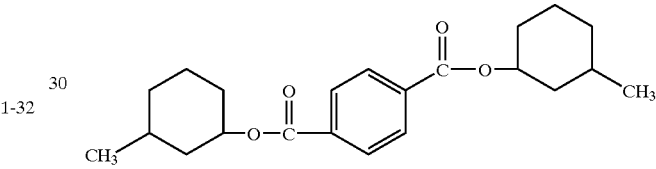
1-38
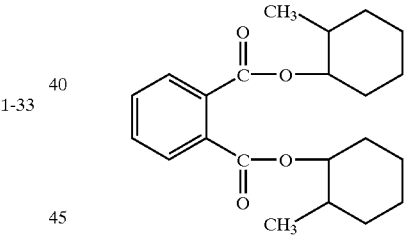
1-39
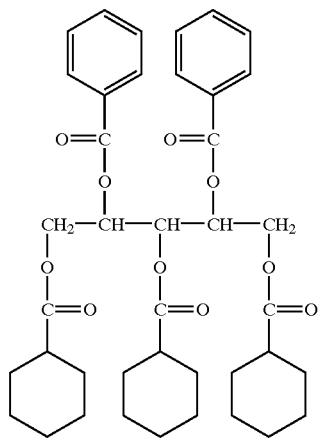

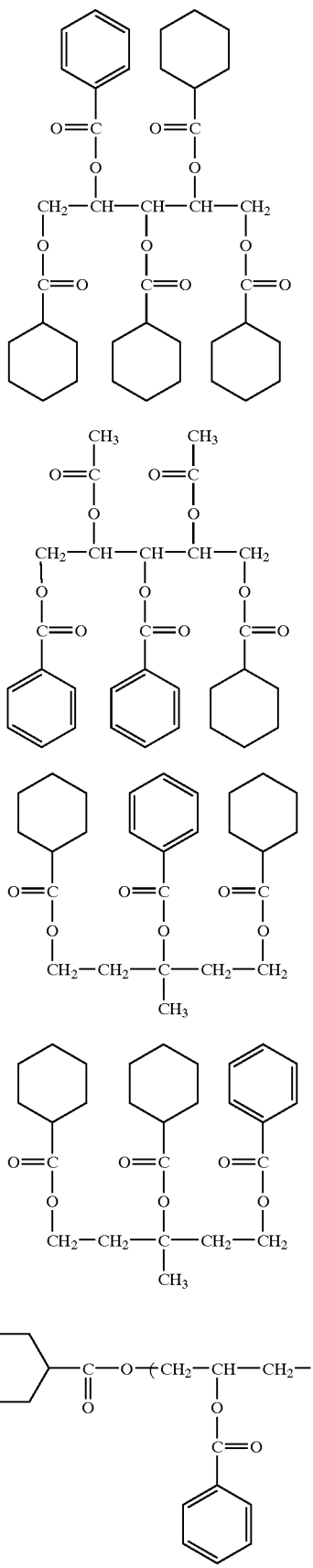

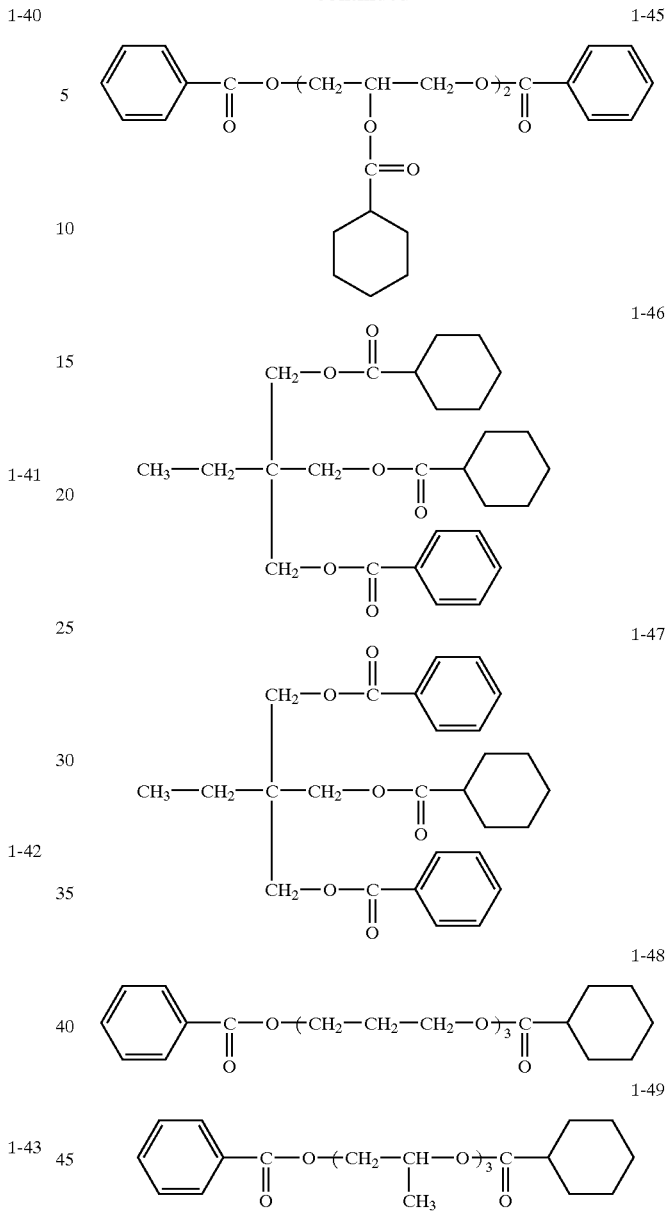

Of the compounds above exemplified, compounds 1-12, 1-14, 1-16, and 1-30 are preferable. The compound represented by formula (1) or the compound represented by formula (1') has a molecular weight of preferably from 200 to 2000, more preferably from 300 to 1500, still more preferably from 350 to 1000, and most preferably from 350 to 500.

The cellulose ester film comprising the compound represented by formula (1) in an amount of 1 to 30% by weight or the cellulose ester film comprising the compound having a chemical structure represented by formula (1') in an amount of 1 to 30% by weight has the advantageous effects in that it provides a good moisture vapor transmittance and an excellent dimensional stability, in spite of reduced thickness of the film. Such a cellulose ester film also has the advantageous effects in that it provides excellent resistance to UV light or to heat and humidity, which is useful for a polarizing plate protective film.

The compound is available on the market, and can be synthesized according to a conventional synthetic method such as a synthetic method employing an esterification reaction.

The preferable film forming process for manufacturing the cellulose ester film of the invention comprises the steps of a dissolution process, a casting process, a solvent evaporation process, a peeling process, a drying process, and a winding process. Each process will be explained below.

(Dissolution Process)

In the invention, a cellulose ester solution also refers to a cellulose ester dope or simply a dope. The dissolution process is one in which cellulose ester in the flake form is dissolved, while stirring, in organic solvents mainly comprised of good solvents described later for the cellulose ester in a dissolution vessel to prepare a dope.

In the invention, the solid content of the dope is preferably not less than 15% by weight, and more preferably from 18 to 35% by weight.

The solid content of the dope is preferably not more than 35% by weight, since a too high solid content of the dope results in too high viscosity, and may form a shark skin surface in the cast web to lower flatness of the finished cellulose ester film.

The viscosity of the dope is preferably adjusted to from 10 to 50 Pa·s.

In order to carry out said dissolution, there are various methods such as a method in which dissolution is carried out at a normal atmospheric pressure, a method in which dissolution is carried out at a temperature lower than the boiling point of the preferable organic solvent (i.e., a good solvent), a method in which dissolution is carried out at a temperature higher than the boiling point of the good solvent under increased pressure, a cooling dissolution method, a method in which dissolution is carried out at a high pressure, and the like. A method in which dissolution is carried out at a temperature higher than the boiling point of the good solvent, for example, 40.4 to 120° C. and at increased pressure, for example, 0.11 to 1.50 Mpa, under the pressure of which the good solvent is not evaporated, makes it possible to carry out a rapid dissolution and to minimize occurrence of foams in the dope.

The cellulose ester used in the invention is preferably a lower fatty acid ester of cellulose.

The lower fatty acid used in preparation of the lower fatty acid ester of cellulose implies a fatty acid having a carbon atom number of not more than 6. Examples of the lower fatty acid ester of cellulose include cellulose acetate, cellulose propionate, cellulose butyrate, and a mixed fatty acid ester of cellulose such as cellulose acetate propionate, or cellulose acetate butyrate as disclosed in Japanese Patent O.P.I. Publication Nos. 10-45804 and 8-231761 and U.S. Pat. No. 2,319,052.

The total acyl substitution degree in the cellulose ester is especially preferably 2.55 to 2.85.

The acyl substitution degree of the cellulose ester can be measured according to ASTM-D-817-96.

Among the cellulose esters, cellulose acetate and cellulose acetate propionate are preferably used. The polymerization degree of the cellulose ester used in cellulose ester film of the invention is preferably from 250 to 400, in view of strength of the film.

The total acyl substitution degree of the cellulose ester used in the cellulose ester film of the invention is preferably 2.5 to 3.0, and more preferably 2.55 to 2.85. The total acyl substitution degree of not less than 2.55 is preferable in increasing mechanical strength of the cellulose ester film comprising the compound represented by formula (1), and the total acyl substitution degree of not more than 2.85 is preferable in increasing dissolution of the cellulose ester in an organic solvent, and in minimizing occurrence of foams in the cellulose ester dope.

In the cellulose acetate propionate, one is preferred which satisfies the following relationship:

$$2.55 \leq X+Y \leq 2.85$$

$$1.5 \leq X \leq 2.4$$

wherein X represents an acetyl substitution degree, and Y represents a propionyl substitution degree.

In the invention, cellulose esters, which are synthesized from cotton lint, a tree pulp or other raw materials, can be used singly or in combination.

The solvent used for preparing a cellulose ester dope may be any solvent as long as it can dissolve cellulose esters. Even a solvent, which does not dissolve cellulose esters, can be used if its mixture with another solvent dissolves cellulose esters. A mixed solvent, containing a poor solvent in an amount of 4 to 30% by weight and methylene chloride as a good solvent, is preferably used.

Examples of good solvents of the cellulose ester include methylene chloride, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,3,3,3-hexafluoro-2-methyl-2-propanol, 1,1,1,3,3,3-hexafluoro-2-propanol, 2,2,3,3,3-pentafluoro-1-propanol, and nitroethane. Of these, a halogenated organic compound such as methylene chloride, dioxolane derivatives, methyl acetate, and ethyl acetate are preferred. Methylene chloride is especially preferred in minimizing curl of the cellulose ester film.

Examples of poor solvents include an alcohol having a carbon atom number of 1 to 8, for example, methanol, ethanol, n-propanol, iso-propanol, n-butanol, sec-butanol, or tert-butanol; methyl ethyl ketone; methyl isobutyl ketone; ethyl acetate; propyl acetate; monochlorobenzene; benzene; cyclohexane; tetrahydrofuran; methylcellosolve; and ethylene glycol monomethyl ether. These poor solvents can be used singly or in combination.

As a method of dissolving the cellulose ester in an organic solvent in the manufacture of the cellulose ester film of the invention, a cooling dissolution method is preferable. The cooling dissolution methods include the method disclosed in Japanese Patent O.P.I. Publication Nos. 9-95538, 9-95544, or 9-95557. The dissolution method carried out at a high pressure, disclosed in Japanese Patent O.P.I. Publication Nos. 11-21379, can be also preferably used.

After the dissolution, the cellulose ester solution (dope) is filtered employing filter materials, is then defoamed, and is subsequently pumped to the next process. In the dissolution, a plasticizer, an anti-oxidant, a UV absorbent, a colorant, or fine particles are preferably added to the dope.

These additives may be mixed with cellulose ester or solvents to prepare a cellulose ester dope, or may be added to the cellulose ester dope while or after the dope is prepared.

A plasticizer can be added to the cellulose ester film of the invention. The plasticizer can be used together with the compound represented by formula (1).

The plasticizers used in the invention include a phosphate plasticizer, a phthalate plasticizer, a glycolic acid ester, and citric acid ester plasticizer, but the invention is not limited thereto. Examples of the plasticizer include a phosphate plasticizer such as triphenyl phosphate, tricresyl phosphate, cresyldiphenyl phosphate, octyldiphenyl phosphate, diphenylbiphenyl phosphate, trioctyl phosphate, or tributyl phosphate; a phthalate plasticizer such as diethyl phthalate, dimethoxyethyl phthalate, dimethyl phthalate, dioctyl phthalate, dibutyl phthalate, di-2-ethylhexyl phthalate, butylbenzyl phthalate or dibenzyl phthalate; a glycolic acid ester such as butyl phthalyl butyl glycolate, ethyl phthalyl ethyl glycolate or methyl phthalyl ethyl glycolate; and a citric acid ester plasticizer such as triethyl citrate, tri-n-butyl citrate, acetyltriethyl citrate, acetyl-tri-n-butyl citrate, or acetyl-tri-n-(2-ethylhexyl) citrate.

These plasticizers may be used singly or in combination. These plasticizers are optionally used as a mixture of two or more kinds thereof. The plasticizer content of the cellulose ester film is preferably 1 to 30% by weight, more preferably 2 to 25% by weight, still more preferably 2 to 15% by weight, and most preferably 3 to 12% by weight.

The cellulose ester film of the invention may contain an additive having the same effect as the plasticizer in addition to the plasticizer. These additives can provide the effects of the invention which the plasticizer provides as long as they are lower molecular weight organic compounds capable of plasticizing the cellulose ester film. These organic compounds are not added to the cellulose ester film for the purpose of plasticizing the film, but can provide the same effects as the plasticizer depending upon the addition amount thereof.

The cellulose ester film of the invention preferably contains a UV absorbent. The UV absorbent in the invention is preferably a UV absorbent which has excellent absorption of ultraviolet light having a wavelength of 370 nm or less, and has reduced absorption of visible light having a wavelength of 400 nm or more in clearly providing a liquid crystal image. The UV absorbents have a transmittance at 370 nm of preferably not more than 10%, more preferably not more than 5%, and most preferably not more than 1%.

The UV absorbents used in the invention are not specifically limited, but they include an oxybenzophenone compound, a benzotriazole compound, a salicylic acid ester compound, a benzophenone compound, a cyanoacrylate compound and a nickel complex compound.

As UV absorbents preferably used in the invention, the benzotriazole or benzophenone type UV absorbent is preferably used which has high transparency, and minimizes deterioration of a polarizing plate or a liquid crystal. The benzotriazole type UV absorbent is especially preferably used, since it minimizes undesired coloration.

The UV absorbents added to the cellulose ester film of the invention are preferably UV absorbents having a distribution coefficient of not less than 8.5. The UV absorbents having a distribution coefficient of not less than 8.5 have the effect lowering a moisture vapor permeation. The distribution coefficient of the UV absorbents is more preferably not less than 9.0, and still more preferably not less than 10.0. The UV absorbents are preferably UV absorbents containing no halogens in the molecules.

Examples of the UV absorbents preferably used in the invention will be shown below, but the invention is not limited thereto.

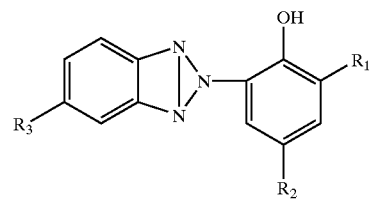

| UV absorbents | $R_1$ | $R_2$ | $R_3$ | Distribution coefficient |
|---|---|---|---|---|
| UV-1 | tert-$C_4H_9$ | $CH_2CH_2COOC_8H_{17}$ | Cl | 10.0 |
| UV-2 | $C_{12}H_{25}$ | $CH_3$ | Cl | 10.0< |
| UV-3 | tert-$C_4H_9$ | tert-$C_4H_9$ | Cl | 9.1 |
| UV-4 | tert-$C_5H_{11}$ | tert-$C_5H_{11}$ | H | 9.0 |
| UV-5 | tert-$C_4H_9$ | $CH_3$ | Cl | 8.6 |
| UV-6 | tert-$C_4H_9$ | tert-$C_4H_9$ | H | 8.4 |

The distribution coefficient expresses the distribution factor of octanol and water defined by the following formula:

Distribution coefficient=Log Po/w, Po/w=So/Sw

So: solubility of a UV absorbent in n-octanol at 25° C.
Sw: solubility of the UV absorber in pure water at 25° C.

The distribution coefficient can be measured employing n-octanol as well as water. However, in the present invention, the distribution coefficient is obtained employing a calculation method according to HPLC. This method employs a high speed chromatography, which is described in an OECD Guideline 117 distribution coefficient (n-octanol/water) high speed chromatography (adopted on Mar. 30, 1989).

Measurement Conditions in HPLC are Described Below.
Apparatus: LC module (manufactured by Waters Co., Ltd.)
Column: Inertsil ODS-2 250 mm×4.6 mm (manufactured by GL Science Co., Ltd.)
Temperature: 40° C.
Eluent: methanol:a 1% aqueous phosphoric acid solution= 90:10
Flow rate: 1.0 ml/minute
Detection wavelength: 210 nm
Injected sample: an approximately 50 ppm methanol solution The UV absorbents can be used singly or as a mixture of two or more kinds thereof. The UV absorbent content of the cellulose ester film is different depending on kinds of UV absorbents used or usage conditions, but is preferably 0.2 to 5 g per $m^2$ of cellulose ester film, and more preferably 0.4 to 2 g per $m^2$ of cellulose ester film.

In the invention, an additive such as a blue dye may be used in order to adjust the hue of the film. The prefereed dyes include anthraquinone dyes. The anthraquinone dyes can have any substituent at the 1- to 8-positions of their chemical structures. The preferred substituents include an anilino group, a hydroxy group, an amino group, a nitro group or hydrogen. The content of the dyes in the cellulose ester film is preferably 0.1 to 1000 $\mu g/m^2$, and more preferably 10 to 100 $\mu g/m^2$ in order to maintain the transparency of the film.

The cellulose ester film of the invention preferably contains particles as a matting agent in order to give a good slip property to the film. The particles were preferably surface treated with an organic compound in giving a reduced haze to the film.

Examples of the organic compound used in the surface treatment include halogenated silanes, alkoxysilanes, silazanes, and siloxanes.

Particles having a larger average particle diameter have a high matting effect, and particles having a smaller average particle diameter have a good transparency. The primary particles of the particles have an average primary particle size of preferably 5 to 50 nm, and more preferably 7 to 20 nm.

The particles used are not specifically limited. Examples of the particles include Aerosil 200, 200V, 300, R972, R972V, R974, R202, R812, OX50, or TT600 (each produced by Nihon Aerosil Co., Ltd.), and Aerosil 200V and R972V are preferred.

These particles ordinarily form secondary particles having an average particle size of 0.01 to 1.0 μm, and exist as aggregates in the cellulose ester film to form a film surface having a peak to valley distance of 0.01 to 1.0 μm. The particle content of the cellulose ester film is preferably 0.005 to 0.3% by weight.

The cellulose ester film of the invention preferably contains silicon dioxide particles, and a cellulose ester film is especially preferred which is prepared employing a cellulose ester dope containing the silicon dioxide particles and a UV absorbent having a distribution coefficient of not less than 8.5, according to a solution cast film manufacture method, since foreign matter, which occurs due to aggregation of the particles in the cellulose ester dope, is minimized.

As the methods of preparing a cellulose ester dope containing a dispersion of the particles as described above, the following three are exemplified.

(Method A)

A solvent and the particles are mixed in a disperser with stirring, and dispersed to obtain a dispersion of the particles. The dispersion is added to a cellulose ester dope, and stirred.

(Method B)

A solvent and the particles are mixed in a disperser with stirring, and dispersed to obtain a dispersion of the particles. Separately, a small amount of cellulose ester is dissolved in a solvent with stirring, and added with the above dispersion to obtain a particle addition solution. The resulting particle addition solution is mixed with a cellulose ester dope in an in-line mixer.

(Method C)

A small amount of cellulose ester is dissolved in a solvent with stirring, added with particles, and dispersed in a disperser to obtain a particle addition solution. The resulting particle addition solution is mixed with a cellulose ester dope in an in-line mixer.

The method A is preferred in that silicon dioxide particles are effectively dispersed in a solvent, and the method C is preferred in that dispersed silicon dioxide particles in a solvent are difficult to be re-aggregated. The method B is more preferred both in that silicon dioxide particles are effectively dispersed in a solvent, and in that dispersed silicon dioxide particles in a solvent are difficult to be re-aggregated.

(Dispersion Method)

When silicon dioxide particles are dispersed in a solvent to obtain a silicon dioxide dispersion, the silicon dioxide concentration of the dispersion is preferably 5 to 30% by weight, more preferably 10 to 25% by weight, and most preferably 15 to 20% by weight. The higher concentration of the particles tends to lower the turbidity of the dispersion, lowers haze, and minimizes occurrence of aggregates, which is preferable.

The organic solvents used in the dispersion include lower alcohols. Examples of the lower alcohols include methyl alcohol, ethyl alcohol, propyl alcohol, and butyl alcohol. Solvents other than the lower alcohols are not specifically limited, and solvents used in the preparation of the cellulose ester dope are preferred.

Employing the cellulose ester dope obtained above, a cellulose ester film can be prepared through a dope cast process explained below.

(Casting Process)

The casting process is one in which a dope is conveyed to a pressure die through a pressure type metering gear pump, and cast from said pressure die on a support (hereinafter referred to also as a support) for casting such as a moving endless metal belt or a rotating metal drum at a casting position. The surface of the support for casting is specular.

As other casting processes, there is a doctor blade method adjusting the dope thickness of the cast dope with a doctor blade or a reverse roller method adjusting the dope thickness of the cast dope with a reverse roller coater rotating reversely. A pressure die is preferred in which the slit shape at the mouth piece portion can be regulated and the film thickness is readily regulated to be uniform. Examples of the pressure die include a coat hanger die, a "T" die, and the like, and any of these is preferably employed.

In order to increase the casting speed, two or more pressure dies may be provided on the metal support and dopes divided into two or more may be simultaneously cast on the metal support. A laminated cellulose ester film can be prepared by simultaneously casting (co-casting) plural cellulose ester dopes different in composition from a die with plural slits on a support.

A cellulose ester film is prepared by casting the cellulose ester dope obtained above on a support such as a belt or a drum. In the invention, a solution cast film manufacture process employing a belt is especially preferred. This is because drying conditions on the support can be easily controlled in detail.

(Solvent Evaporation Process)

The solvent evaporation process is one in which a web (in the invention, a film is called a web which is formed after a dope is cast on a support for casting) is heated on a support for casting and solvents are evaporated. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined. The cast web on the support is dried preferably on the support at 40 to 100° C. Heating the web to a temperature of 40 to 100° C. is preferably carried out employing air having that temperature or an infrared ray heater.

In the invention, the web is preferably peeled within the time range of from 30 to 90 seconds after the casting on the support in view of peeling property, film surface quality, moisture vapor permeability and film curl.

The peeling process is one in which a web, which has been subjected to evaporation of solvents on the support, is peeled at the peeling position. The peeled web is conveyed to the subsequent process. When the residual solvent amount (represented by the formula described below) is too large, it may be difficult to peel the web. On the contrary, when peeling is carried out after fully drying the web on the support, a part of the web may peel prior to the peeling position.

It is preferred in the invention that temperature at the peeling position on the support is 10 to 40° C., and preferably 11 to 30° C. The residual solvent amount at the peeling position is preferably 25 to 120% by weight, and more preferably 40 to 100% by weight.

The residual solvent amount in the invention is expressed employing the following formula:

Residual solvent amount (weight %)={(weight of a web before heat treatment−weight of a web after heat treatment)/weight of a web before heat treatment}×100 wherein the heat treatment represents heating the web at 115° C. for one hour.

In order to adjust the residual solvent to the amount described above at the peeling position, the temperature of the support at the peeling position is preferably set at the range described above so that evaporation of the organic solvent from the web was effectively carried out by controlling the temperature of the surface of the support for casting. In order to control the temperature of the support, a heat transfer method having a good efficiency of heat transfer, for example, heat transfer from the rear surface of the support, is preferred.

A heat transfer employing radiant heat or a hot air is difficult to control the temperature of the support, and is not so preferable. When the support is a rotating belt, and is at the lower position, the temperature of the belt can be controlled by mildly blowing the hot air onto the support.

The support temperature can be varied at the different positions of the support through different heating methods, and can be varied at the casting position on the support, at the drying position on the support, or at the peeling position on the support.

Listed as a method to increase the film forming speed is a gel casting method (in which peeling can be carried out even though the amount of residual solvents is relatively great).

The gel casting methods include a method in which poor solvents with respect to the cellulose ester are added to a dope and gelling is carried out after casting said dope, and also a method in which gelling is carried out by decreasing the temperature of a support, and the like. There is further a method in which metal salts are added to the cellulose ester dope.

By strengthening the web through gelling the dope on the support, it is possible to carry out earlier peeling and to increase the casting speed.

When the peeling is carried out at the time when the residual solvent amount is still relatively great, the web may be too soft, in which during peeling, the flatness of the web tends to be degraded, and wrinkles and longitudinal streaks due to the peeling tension tend to be formed. Accordingly, the residual solvent amount at the peeling is determined so that productivity and quality are balanced. The web is ordinarily peeled from the support at a peel tension of 196 to 245 N/m. When wrinkles easily occur, the peel tension is preferably not more than 190 N/m, more preferably from a possible lowest peel tension to 166.6 N/m, still more preferably from a possible lowest peel tension to 137.2 N/m, and most preferably from a possible lowest peel tension to 100 N/m. Less peel tension is preferred, since a retardation in plane $R_0$ can be maintained lower. The retardation in plane $R_0$ is preferably less than 20 nm, more preferably less than 10 nm, still more preferably less than 5 nm, and most preferably from 0 to 1 nm.

In the invention, a retardation in plane $R_0$ of a cellulose ester film can be computed from refractive indices at a wavelength 590 nm in the three axis directions, nx, ny, and nz of the film obtained by being measured by means of an automatic birefringence meter KOBRA-21ADH (produced by Oji Keisokukiki Co., Ltd.). The retardation in the thickness direction Rt of the film is preferably 0 to 300 nm, more preferably 0 to 150 nm, and most preferably 0 to 70 nm.

$$R_0 = (nx - ny) \times d$$

$$Rt = \{(nx + ny)/2 - nz\} \times d$$

The cellulose ester film of the invention satisfies preferably the following formula between a retardation in plane $R_0$ and an angle θ (radian) of the delayed phase axis direction with respect to the mechanical direction, and such a cellulose ester film is preferably used as an optical film such as a protective film of a polarizing plate.

$$P \leq 1 - \sin^2(2\theta)\sin^2(\pi R_0/\lambda)$$

$$P = 0.9999$$

In the above formula, nx represents the refractive index in the delayed phase axis direction in the plane of the film, ny represents the refractive index in the advanced phase axis direction in the plane of the film, nz represents the refractive index in the thickness direction of the film, d represents the film thickness (nm), θ represents the angle (radian) of the delayed phase axis direction in the plane of the film with respect to the mechanical direction of the film, λ represents the wavelength 590 nm of light used for measuring the above nx, ny, nz, and θ, and π represents the circle ratio.

(Drying Process)

The drying process is a process, which dries the web employing a drying apparatus in which said web is alternatively transported through staggered rollers and/or a tenter apparatus in which said web is transported while holding both edges of the web employing clips. In the drying process, a transport tension for transporting the web is preferably the possible lowest, since $R_0$ can be maintained lower. The transport tension is preferably not more than 190 N/m, more preferably not more than 170 N/m, still more preferably not more than 140 N/m, and most preferably from 100 to 130 N/m. It is especially effective that the transport tension is maintained within the above range till the residual solvent amount is not more than 5% by weight.

A common drying method is one in which both surfaces of the web are heated by heated air flow. Instead of the air flow, employed is a method in which heating is carried out employing microwaves. Too rapid drying tends to degrade the flatness of the finished film. A high temperature drying is preferably applied to the web having a residual solvent content of not more than 8% by weight. During the entire drying process, drying temperature is commonly from 40 to 250° C., and preferably 40 to 160° C.

In the drying process after peeling the web from the support, the web tends to shrink in the transverse direction due to evaporation of the organic solvent. When the web is dried rapidly at a higher temperature, the tendency of the web shrinkage is stronger.

Drying of the web while the shrinkage is minimized as far as possible is preferable in improving a flatness of the finished cellulose ester film. In view of the above, a method disclosed in Japanese Patent O.P.I. Publication No. 62-46625 is preferably used which comprises drying the web while holding the both edges in the transverse direction of the web by clips or pins to maintain the web width (called "a tenter method"). A tenter method employing clips or a pin-tenter method employing pins is preferably used.

Drying the web while maintaining the web width can provide a cellulose ester film in which a retardation in plane Ro of the film is reduced. In this case, the stretching magnification factor in the transverse direction of the web is preferably from 1.00 to 1.15, and more preferably from 1.01 to 1.1. It is preferred in the tenter method that the residual solvent of the web at initial tenter stage is from 20 to 70% by weight, and drying is carried out until the residual solvent of the web is not more than 10% by weight, and preferably not more than 5% by weight.

When the cellulose ester film of the invention is used as a phase difference film, the web containing the residual solvent at the peeling can be stretched in the transverse direction and/or in the mechanical direction by a factor of from 1.01 to 2.5. In this case, the web is stretched by a factor of preferably from 1.15 to 1.6, which can provide a cellulose ester film having an $R_0$ of from 20 to 1000 nm.

The cellulose ester film peeled from the support is further dried in the drying process to give a residual solvent content in the film of preferably not more than 0.5 weight %, more preferably not more than 0.1 weight %, and most preferably from 0 to 0.01 weight %.

In the drying process of the film, the film is generally transporting on rollers or in the above pintenter while drying. The film for a liquid crystal display is preferably dried maintaining the film width in the pintenter, which increases dimensional stability of the film. It is especially preferable in view of increased film dimensional stability that the film is dried while holding the film width of a film immediately after the film is peeled from the support, which still has a relatively high residual solvent content. The means for drying the film is not specifically limited, and heated air, infrared light, heated rollers or micro waves are generally employed. The heated air is preferably used in view of its convenience. It is preferable that the drying temperature is gradually elevated in separate 3 to 5 stages in the range of from 40 to 150° C. It is more preferable in view of film dimensional stability that the drying temperature is gradually elevated in separate 3 to 5 stages in the range of from 80 to 140° C.

In the process from the casting to the drying in the solution cast film manufacture process, drying of the web in the drying apparatus may be carried out at an air atmosphere or at an atmosphere of an inert gas such as a nitrogen gas, a carbon dioxide gas or an argon gas.

It is not needless to say that the explosion limits of the vaporized organic solvents in the drying apparatus should be always considered.

(Winding Process)

This process is one in which after the residual solvent content of the web is not more than 2% by weight, the resulting cellulose ester film is wound around a spool. The cellulose ester film having a residual solvent content of not more than 0.4% by weight provides good dimensional stability.

Any of conventional winding methods can be used, and examples of the winding methods include a constant torque method, a constant tension method, a taper tension method, and a method programmed so as to have a constant inside stress.

The thickness of the cellulose ester film can be adjusted by controlling a dope concentration, a dope amount supplied by a pump, a slit width of the mouth piece portion of a die, an extrusion pressure of a die, or a moving speed of a support for casting.

It is preferred that the thickness of the cellulose ester film is uniformly regulated by feeding back a thickness information detected by a thickness detector to the devices described above through a system programmed in advance for information to be fed back to them.

The optimum thickness of the cellulose ester film is different depending upon purpose of use. The thickness of the cellulose ester film is ordinarily from 5 to 500 μm, and preferably from 10 to 200 μm. The thickness of a cellulose ester film used in a liquid crystal display is from 10 to 120 μm. The cellulose ester film of the invention has a good moisture vapor transmittance, and excellent dimensional stability, even when it has a reduced thickness of 10 to 60 μm.

In the invention, moisture vapor transmittance of the film was measured at 25±0.50° C. and 90±2% RH (condition A) according to a method described in JIS Z 0208. The moisture vapor transmittance of the film is preferably from 20 to 250 $g/m^2 \cdot 24$ hours, and more preferably 25 to 250 $g/m^2 \cdot 24$ hours. The above range of the moisture vapor transmittance is preferred in view of durability of a polarizing plate employing the film or drying of an adhesive used in the manufacture of a polarizing plate employing the film.

Dimensional stability of the cellulose ester film of the invention can be improved by reducing the weight change of the film after storage at 80° C. and at 90% RH.

The cellulose ester film of the invention has rate of weight change within the range of preferably ±2%, the rate representing, in terms of percentage, the ratio of the difference between the film weights before and after storage at 80° C. and 90% RH for 48 hours to the film weight before the storage. Such a cellulose ester film, even when it has a reduced thickness, provides an excellent dimensional stability as well as improved moisture vapor permeability.

After the cellulose ester film of the invention is stored at 80° C. and at 90% RH for 48 hours, rate of dimensional change in the mechanical direction (MD) of the film and rate of dimensional change in the transverse direction (TD) of the film both are preferably within the range of ±0.5%, more preferably within the range of ±0.3%, still more preferably within the range of ±0.1%, and most preferably within the range of ±0.05%.

The rate of dimensional change referred to in the invention is a characteristic value showing dimensional change in the mechanical and transverse directions of the film after stored under severe conditions such as high temperature and high humidity. Typically, after the film is stored at high temperature, at high humidity or at high temperature and high humidity, dimensional change in the mechanical and transverse directions of the film is measured.

A film sample for test was cut into a size of 150 mm (in the transverse direction)×120 mm (in the mechanical direction), and two points 100 mm distant from each other were marked with the cross "+" on the film surface in each of the mechanical direction (MD) and the transverse direction (TD), employing a knife. The resulting sample was subjected to humidity conditioning at 23° C. and at 55% RH for 24 hours, and the distances L1 in the mechanical and transverse directions between the two points before high temperature and high humidity treatment was measured through a factory microscope. Thereafter, the sample was subjected to high temperature and high humidity (at 80° C. and at 90% RH for 48 hours), and then again subjected to humidity conditioning at 23° C. and at 55% RH for 24 hours. The distances L2 in the mechanical and transverse directions between the two points after the treatment were measured through a factory microscope. The rate of dimensional change is represented by the following formula:

Rate (%) of dimensional change=$\{(L2-L1)/L1\} \times 100$ wherein L1 represents the distance before the treatment between the two points, and L2 represents the distance after the treatment between the two points.

Intended dimensional change of the film can be measured by marking two points on the film surface in each of the transverse and mechanical directions After the cellulose ester film is stored at 105° C. for 5 hours, the rate of dimensional change in the MD direction and the rate of dimensional change in the TD direction both fall within the range of preferably ±0.5%, more preferably ±0.3%, still more preferably ±0.1%, and most preferably ±0.05%.

In the cellulose ester film of the invention, tensile stress in the MD direction of the film and tensile stress in the TD direction of the film both are preferably from 90 to 170 $N/mm^2$, and more preferably from 120 to 160 $N/mm^2$.

The moisture content of the cellulose ester film is preferably from 0.1 to 5%, more preferably from 0.3 to 4%, and most preferably from 0.5 to 2%.

The cellulose ester film of the invention has a transmittance of preferably not less than 90%, more preferably not less than 92%, and most preferably not less than 93%. The cellulose ester film of the invention has a haze of preferably not more than 0.5, more preferably not more than 0.1%, and most preferably 0%.

The absolute curl value of the cellulose ester film of the invention is preferably lower. The film curl can be in the + direction or in the − direction. The absolute curl value of the cellulose ester film is preferably not more than 30, more preferably not more than 20, and most preferably not more than 10. The curl value is represented in terms of radius of curvature (1/m).

The process of manufacturing the cellulose ester film of the invention according to a solution cast film manufacture method will be explained below employing figures.

FIG. 1 is a schematic view showing one of preferred embodiments of a solution cast film manufacture process. FIG. 1(a) is a schematic view showing a process which comprises a dope casting step, and a roller transporting and drying step in that order. FIG. 1(b) is a schematic view showing a process which comprises a dope casting step, a roller transporting and drying step, and a tenter transporting and drying step in that order. FIG. 1(c) is a schematic view showing a process which comprises a dope casting step, a tenter transporting and drying step, and a roller transporting and drying step in that order. FIG. 1(d) is a schematic view showing a process which comprises a dope casting step, a first roller transporting and drying step, a tenter transporting and drying step, and a second roller transporting and drying step in that order.

In the invention, the process comprising a tenter transporting and drying step or a roller transporting and drying step is a process which resides between a web peeling step and a web winding step, during which elongation or shrinkage of the web is regulated. The tenter transporting and drying step refers to a step of drying a cellulose ester web while transporting the web in a tenter, during which elongation or shrinkage of the web is regulated. The roller transporting and drying step refers to a step of drying a cellulose ester web while transporting the web through rollers, during which elongation or shrinkage of the web is regulated.

In FIGS. 1(a) through 1(d), numerical number 1 shows an endless moving belt support. As the support is used a mirror surface metal band. Numerical number 2 shows a die for casting on the support 1 a dope in which cellulose ester is dissolved in a solvent. Numerical number 3 shows a peel position at which, after the cast dope is solidified on the support 1 to form a web, the web is peeled from the support 1. Numerical number 4 shows a peeled web. Numerical number 5 shows a tenter transporting and drying step. Numerical number 51 shows an air discharging port, and numerical number 52 shows a drying air introducing port. Air discharging port 51 and the drying air introducing port 52 may be reversed. Numerical number 6 shows a tension changing means. Examples of the tension changing means include nip rollers and suction rollers. The tension changing means may be located between any two adjacent steps.

Numerical number 8 shows a roller transporting and drying step. Numerical number 81 shows a drying chamber, numerical number 82 shows an air discharging port, and numerical number 83 shows a drying air introducing port. The air discharging port 82 and the drying air introducing port 83 may be reversed. Numerical number 84 shows upper transporting rollers, and numerical number 85 shows lower transporting rollers. One upper transporting roller and one lower transporting roller which immediately follows constitute one pair of transporting rollers, and transporting rollers 84 and 85 are composed of plural pairs of transporting rollers. Numerical number 7 shows a cellulose ester film winding step at which the cellulose ester film is wound around a spool to form a roll.

In a process illustrated in FIG. 1(d), the roller transporting and drying step, which resides upstream of the tenter transporting and drying step 5, is called a first roller transporting and drying step, and the roller transporting and drying step, which resides downstream of the tenter transporting and drying step 5, is called a second roller transporting and drying step. A cooling step, which is not illustrated in any of FIG. 1(a) through FIG. 1(d), may be optionally provided prior to the cellulose ester film winding step.

In the invention, a cellulose ester film can be manufactured according to any solution cast film manufacture method as described above.

The cellulose ester film of the invention is preferably used in a member of a liquid crystal display such as a polarizing plate protective film in view of good moisture vapor permeation and dimensional stability thereof. The cellulose ester film of the invention is especially preferably used in a polarizing plate protective film in which severe moisture vapor permeation and dimensional stability both are required.

The polarizing plate in the invention can be prepared according to conventional methods. There is, for example, a method in which an optical film or a cellulose ester film is subjected to an alkali saponification, and the resulting film is adhered through an aqueous completely saponified polyvinyl alcohol solution to both surfaces of a polarizing film which is prepared by immersing a polyvinyl alcohol film in an iodine solution, and stretching the resulting film. The alkali saponification refers to treatment in which the cellulose ester film is immersed in a strong alkali solution at high temperature in order to enhance wettability of the film to an aqueous adhesive and provide good adhesion to the film.

Various functional layers such as a hard-coat layer, an anti-glare layer, an anti-reflection layer, an anti-stain layer, an anti-static layer, a conductive layer, an optically anisotropic layer, a liquid crystal layer, an orientation layer, a sticky layer, an adhesion layer, and a subbing a sticky layer can be provided on the cellulose ester film of the invention. These functional layers can be provided on the film by coating, evaporation, spattering, plasma CVD or plasma treatment under atmospheric pressure.

The polarizing plate obtained above is provided on both sides or one side of a liquid crystal cell, and the resulting material is installed in a liquid crystal display.

When the cellulose ester film of the invention is used in a polarizing plate protective film, a polarizing plate having a reduced thickness and having excellent durability, dimensional stability and optical isotropy can be obtained. A liquid crystal display, employing the polarizing plate or the phase difference film of the invention, can maintain stable displaying performance for a long term.

The cellulose ester film of the invention is also used for an anti-reflection film or an optical compensation film.

EXAMPLES

The invention will be detailed according to the following examples, but is not limited thereto.

Example 1

1. Preparation of a Dope

The dope composition A as shown below was incorporated in a tightly sealed vessel, and stirred at 80° C. under increased pressure to prepare a cellulose ester solution. Particles AEROSIL 200V (produced by Nippon Aerosil Co., Ltd.) were dispersed in a part of ethanol to be added, and incorporated in advance in the tightly sealed vessel. The resulting cellulose ester solution was cooled to a temperature at which casting was carried out, allowed to stand, subjected to defoaming treatment, and filtered employing Azumi filter paper No. 244, produced by Azumi Roshi Co., Ltd. Thus, a dope A was prepared. Dopes B through G were prepared in a similar manner as a dope A.

(Measurement of Substitution Degree of Cellulose Ester Used)

The substitution degree of cellulose ester used was measured according to the method defined in ASTM-D817-96.

| (Dope composition A) | |
|---|---|
| Compound 1-14 (a compound falling within formula (1)) UV absorbents | 15 kg |
| UV-1 | 0.5 kg |
| UV-2 | 0.5 kg |
| UV-5 | 0.5 kg |
| Particles AEROSIL 200V (produced by Nippon Aerosil Co., Ltd.) | 0.05 kg |
| Acetyl cellulose with an acetyl substitution degree of 2.7 | 83.5 kg |
| Methylene chloride | 290 l |
| Ethanol | 25 l |
| (Dope composition B) | |
| Compound 1-30 (a compound falling within formula (1)) UV absorbents | 15 kg |
| UV-1 | 0.5 kg |
| UV-2 | 0.5 kg |
| UV-5 | 0.5 kg |
| Particles AEROSIL 200V (produced by Nippon Aerosil Co., Ltd.) | 0.05 kg |
| Cellulose acetate propionate with an acetyl substitution degree of 2.0 and a propionyl substitution degree of 0.8 | 83.5 kg |
| Methylene chloride | 265 l |
| Ethanol | 50 l |
| (Dope composition C) | |
| Compound 1-12 (a compound falling within formula (1)) UV absorbents | 15 kg |
| UV-1 | 0.5 kg |
| UV-2 | 0.5 kg |
| UV-5 | 0.5 kg |

-continued

| | |
|---|---|
| Particles AEROSIL 200V (produced by Nippon Aerosil Co., Ltd.) | 0.05 kg |
| Cellulose acetate propionate with an acetyl substitution degree of 2.0 and a propionyl substitution degree of 0.8 | 83.5 kg |
| Methyl acetate | 210 l |
| Ethanol | 90 l |
| (Dope composition D) | |
| Compound 1-16 (a compound falling within formula (1)) UV absorbents | 15 kg |
| UV-1 | 0.5 kg |
| UV-2 | 0.5 kg |
| UV-5 | 0.5 kg |
| Particles AEROSIL 200V (produced by Nippon Aerosil Co., Ltd.) | 0.05 kg |
| Triacetyl cellulose with an acetyl substitution degree of 2.88 | 83.5 kg |
| Methylene chloride | 290 l |
| Ethanol | 25 l |
| (Dope composition E) | |
| Compound 1-16 (a compound falling within formula (1)) UV absorbents | 15 kg |
| UV-6 | 1.5 kg |
| Particles AEROSIL 200V (produced by Nippon Aerosil Co., Ltd.) | 0.05 kg |
| Triacetyl cellulose with an acetyl substitution degree of 2.88 | 83.5 kg |
| Methylene chloride | 290 l |
| Ethanol | 25 l |
| (Dope composition F) | |
| Comparative Compound shown later UV absorbents | 15 kg |
| UV-1 | 0.5 kg |
| UV-2 | 0.5 kg |
| UV-5 | 0.5 kg |
| Particles AEROSIL 200V (produced by Nippon Aerosil Co., Ltd.) | 0.05 kg |
| Triacetyl cellulose with an acetyl substitution degree of 2.88 | 83.5 kg |
| Methylene chloride | 290 l |
| Ethanol | 25 l |
| (Dope composition G) | |
| Triphenyl phosphate (TPP) UV absorbents | 15 kg |
| UV-1 | 0.5 kg |
| UV-2 | 0.5 kg |
| UV-5 | 0.5 kg |
| Particles AEROSIL 200V (produced by Nippon Aerosil Co., Ltd.) | 0.05 kg |
| Triacetyl cellulose with an acetyl substitution degree of 2.88 | 83.5 kg |
| Methylene chloride | 290 l |
| Ethanol | 25 l |

Comparative Compound

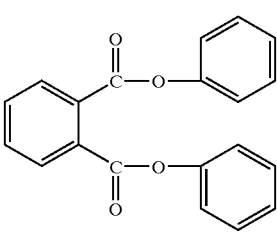

2. Preparation of Cellulose Ester Film

Cellulose ester film was prepared according to the procedures described below employing an apparatus as shown in FIG.(d).

The dope A was uniformly cast at 30° C. on an endless stainless steel belt support, which was heated on the rear side with 35° C. water, to form a dope film. The dope film was blown with 45° C. air and dried. Thirty minutes after the casting, the film was peeled from the support, and further dried while transporting through many rollers. The temperature at the peel position on the endless stainless steel belt support was set at 10° C. The peeled film was further dried while transported for one minute in a first dry zone set at 50° C., transported for 30 seconds in a second dry zone set at 90° C., and transported for ten minutes in a third dry zone set at 115° C. In the second dry zone, the film was stretched by a factor of 1.05 in the transverse direction by means of a tenter. The dried film was wound around a spool to obtain a cellulose ester film in the roll form with a roll length of 2500 m and with a thickness of 40 μm. The residual solvent content at the winding of the film was less than 0.0% by weight. Thus, cellulose ester film sample 1 was prepared.

Cellulose ester film samples 2 through 7 were prepared in the same manner as in cellulose ester film sample 1, except that dopes B through G were used, respectively, instead of dope A. The resulting cellulose ester film samples are shown in Table 1.

The cellulose ester film samples 1 through 7 were evaluated according to the following methods, and the results are also shown in Table 1.

Evaluation of Cellulose Ester Film Samples (Measurement of Retardation $R_O$)

Refractive indices at wavelength 590 nm in the three axis directions, Nx, Ny, and Nz of each cellulose ester film sample were measured by means of a birefringence meter KOBRA-21ADH (produced by Oji Keisokukiki Co., Ltd.), and retardation Ro was computed according to the following formula.

$$R_O = (Nx - Ny) \times d$$

wherein Nx represents a maximum refractive index in plane of the film, Ny represents a refractive index in plane of the film in the direction normal to that providing Nx, and d represents a thickness (nm) of the film.

(Measurement of Rate of Dimensional Change)

Each sample was cut into a size of 150 mm (in the transverse direction)×120 mm (in the mechanical direction), and employing a knife, two points 100 mm distant from each other were marked with the cross "+" on the film surface in each of the mechanical direction (MD) and the transverse direction (TD). The resulting sample was subjected to humidity conditioning at 23° C. and at 55% RH for 24 hours, and the distances L1 in the mechanical and transverse directions between the two points before high temperature and high humidity treatment was measured through a factory microscope. Thereafter, the sample was subjected to high temperature and high humidity treatment at 80° C. and at 90% RH for 48 hours, and then again subjected to humidity conditioning at 23° C. and at 55% RH for 24 hours. The distances L2 in the mechanical and transverse directions between the two points after the treatment were measured through a factory microscope. The rate of dimensional change is represented by the following formula:

$$\text{Rate (\%) of dimensional change} = \{(L2-L1)/L1\} \times 100$$

wherein L1 represents the distance before the treatment between the two points, and L2 represents the distance after the treatment between the two points.

(Moisture Vapor Transmittance)

Moisture vapor transmittance of the film was measured at 25±0.5° C. and 90±2% RH (condition A) according to a method described in JIS Z 0208, and represented in terms of a moisture amount (g), which evaporated from the sample in 24 hours per 1 m² of the sample.

(Rate of Weight Change)

From each sample was cut a 10×10 cm² film sample. The resulting sample was allowed to stand at 23° C. and at 55% RH for 24 hours, and then weighed. Subsequently, the sample was subjected to heat treatment at 80° C. and at 90% RH for 48 hours. After the surface of the resulting sample was softly wiped, the sample was again allowed to stand at 23° C. and at 55% RH for one day, and then weighed. The rate of weight change is represented by the following formula:

$$\text{Rate of weight change (\%)} = \{(\text{Film weight before heat treatment} - \text{Film weight after heat treatment})/\text{Film weight before heat treatment}\} \times 100$$

(Resistance to UV Light)

Employing an EYE SUPER UV TESTER TYPE SUV-F1 (produced by IWASAKI ELECTRIC Co., LTD.), each sample was subjected to UV irradiation of 1500 mW/cm² for 96 hours through a metal halide lamp. After the irradiation, change of hue of the sample was observed, and a test of folding the sample into two parts was carried out. The sample was evaluated according to the following criteria.

A: Neither discoloration of the hue nor breakage due to folding after UV irradiation was observed.
B: Both discoloration of the hue and breakage due to folding after UV irradiation were observed.

(Measurement of Curl Value)

Each cellulose ester film sample was stored at 23° C. and 55% RH for 48 hours, and cut into a piece with a size of 2 mm (in the mechanical direction)×50 mm (in the transverse direction). The resulting film piece was further subjected to humidifying treatment at 23±2° C. and 55% RH for 24 hours. Thereafter, a circle having an arc equal to the curl of the resulting piece was determined employing a curvature scale, and the radius of curvature of the circle was obtained as the curl value of the cellulose ester film sample.

Foreign Matter Defects (Foreign Material Defects)

The number of foreign materials with a size of not less than 30 μm per m² of each sample was counted.

TABLE 1

| Cellulose ester film sample No. | Kinds of dope | Thickness (μm) | Moisture vapor transmittance (g/m² · 24 hr) | Rate of weight change (%) | Rate of dimensional change (%) | Resistance to UV light | R₀ (nm) | Foreign material defects | Curl value (1/m) | Remarks |
|---|---|---|---|---|---|---|---|---|---|---|
| 1 | Dope A | 40 | 180 | 0.1 | −0.05 | A | 0 | 4 | 10 | Inv. |
| 2 | Dope B | 40 | 195 | 0.1 | −0.05 | A | 1 | 3 | 10 | Inv. |
| 3 | Dope C | 40 | 190 | 0.1 | −0.05 | A | 1 | 5 | 5 | Inv. |
| 4 | Dope D | 40 | 200 | 0.2 | −0.1 | A | 2 | 5 | 15 | Inv. |
| 5 | Dope E | 40 | 220 | 0.2 | −0.1 | A | 2 | 15 | 15 | Inv. |
| 6 | Dope F | 40 | 200 | 1.5 | −0.8 | B | 5 | 25 | 20 | Comp. |
| 7 | Dope G | 40 | 255 | 2.4 | −1.5 | A | 6 | 20 | 20 | Comp. |

Inv.: Inventive,
Comp.: Comparative

As is apparent from Table 1 above, inventive cellulose ester film samples provided a low moisture vapor transmittance, excellent rate of weight change, and excellent dimensional stability, although they had a reduced thickness. Further, inventive cellulose ester film samples were confirmed to give film having a low retardation in plane (Ro). In contrast, comparative cellulose ester film sample 6 provided a poor rate of weight change and a poor dimensional stability. Further, comparative sample 6 was confirmed to give a film which was extremely poor in resistance to UV light, resulting in discoloration due to UV irradiation and breakage due to folding after UV irradiation. It was confirmed that comparative cellulose ester film sample 7 could not provide a sufficiently low moisture vapor transmittance, and provided poor dimensional stability as well as poor rate of weight change.

In inventive cellulose ester film samples 1 through 5, neither discoloration after UV irradiation nor breakage due to folding after the UV irradiation was observed. As is apparent from the aforementioned, in comparative cellulose ester film sample 6, both discoloration after UV irradiation and breakage due to folding after the UV irradiation were observed. That is, it was confirmed that deterioration due to UV irradiation was caused in the comparative cellulose ester film sample 6.

Polarizing plates (inventive) were prepared employing the inventive cellulose ester film samples 1 through 5, which contained a compound represented by formula (1). The resulting polarizing plates were evaluated for their durability, and the results exhibited excellent durability. In contrast, polarizing plates (comparative) prepared employing the comparative cellulose ester film sample 6 or 7 exhibited poor durability.

A liquid crystal display employing the inventive polarizing plates could maintain an initial image contrast over a long term.

Example 2

Polarizing plate samples were prepared employing the cellulose ester film samples prepared in Example 1 according to the procedures described later, and the resulting polarizing plate samples were evaluated according to the methods also described later.

Polarizing plate sample 1 (inventive) was prepared employing a cellulose ester film sample 1 as a polarizing plate protective film according to the following procedures.
1. Preparation of Polarizing Film
A 120 μm thick polyvinyl alcohol film was uniaxially stretched (at 110° C. by a factor of 5). The resulting film was immersed for 60 seconds in an aqueous solution comprised of 0.075 g of iodine, 5 g of potassium iodide, and 100 g of water, further immersed at 68° C. in an aqueous solution comprised of 6 g of potassium iodide, 7.5 g of boric acid, and 100 g of water, washed with water, and dried. Thus, a polarizing film was obtained.
2. Preparation of Polarizing Plate
The polarizing film obtained above and a polarizing plate protective film sample were laminated to obtain a polarizing plate sample according to the following procedures 1 to 5.
Procedure 1: A cellulose ester film sample 1 prepared in Example 1 was cut to obtain two specimens with a size of 30 cm (in the mechanical direction)×18 cm (in the transverse direction). The resulting specimens were immersed in an aqueous 2 mol/liter sodium hydroxide solution at 60° C. for 90 seconds, washed with water, and dried. Thus, two polarizing plate protective film samples 1 were obtained.
Procedure 2: The polarizing film obtained above was cut into a size of 30 cm (in the mechanical direction)×18 cm (in the transverse direction), and immersed in a polyvinyl alcohol adhesive (with a solid content of 2% by weight) for 1 to 2 seconds to form an adhesive layer.
Procedure 3: The excessive adhesive of the adhesive layer on the polarizing film prepared in Procedure 2 was softly removed. The one protective film sample 1 was laminated onto one surface of the resulting polarizing film and further, the other protective film sample 1 was laminated onto the other surface of the polarizing film so that it contacted the adhesive layer of the polarizing film.
Procedure 4: pressure was applied through a hand roller to the laminate with a polarizing film and protective film samples 1 obtained in the Procedure 3 to remove foams or excessive adhesive from the ends of the laminate. The pressure applied by the hand roller was from 20 to 30 N/cm², and the roller speed was 2 m/min.
Procedure 5: The sample obtained in the procedure 4 was dried at 80° C. for 2 minutes in a dryer. Thus, a polarizing plate sample 1 (inventive) was obtained.

Polarizing plate samples 2 through 7 were prepared in the same manner as in polarizing plate sample 1, except that cellulose ester film samples 2 through 7 were used, respectively, instead of a cellulose ester sample 1.

Each polarizing plate sample obtained above was subjected to high temperature and high humidity treatment at 80° C. and 90% RH for 50 hours. Thereafter, a transmittance and a degree of polarization were measured according to the following methods.
(Measurement of Transmittance)
Spectral transmittances τ (λ) of each polarizing plate sample were measured at an interval of 10 nm in the wavelength range of from 400 to 700 nm. A transmittance T of each sample was obtained from the following equation 1.

$$T = \frac{\int_{400}^{700} P(\lambda) \cdot y(\lambda) \cdot \tau(\lambda) \cdot d\lambda}{\int_{400}^{700} P(\lambda) \cdot y(\lambda) \cdot d\lambda} \quad \text{Equation 1}$$

wherein P(λ) represents a spectral distribution function of a standard light (C light source), and y(λ) represents a color matching function based on the 2° viewing field X, Y and Z system.

The spectral transmittances τ (λ) were measured through a spectro-photometer SIMAZU UV 2200.
(Measurement of Degree of Polarization)

A transmittance Tp in parallel of a specimen was measured, the specimen being obtained by laminating two of each polarizing plate sample so that orientation of the polarizing element of one polarizing plate was in the same direction as that of the other polarizing plate. Further, a transmittance Tc in cross of a specimen was measured, the specimen being obtained by laminating two of each polarizing plate sample so that orientation of the polarizing element of one polarizing plate was in the direction normal to that of the other polarizing plate.

The degree of polarization P of each sample was calculated from the following Equation 2.

$$P = \sqrt{\frac{Tp - Tc}{Tp + Tc}} \times 100 \quad \text{Equation 2}$$

Durability of Polarizing Plate

Two polarizing plates with a size of 10×10 cm² per each polarizing plate sample were cut, and subjected to heating and humidifying treatment at 80° C. and 90% RH for 50 hours. Subsequently, one plate was laminated on the other to be arranged in a crossed Nicol state so that the adjacent two sides of one plate were in accordance with those of the other. In the resulting polarizing plate laminate, one plate was longer than the other by a length, and the edge of the laminate having the length appeared white. The length of the edge on the central line of the longer plate was measured, and durability of the polarizing plate sample was evaluated according to the following evaluation criteria.

The expression "appeared white" means the phenomenon that the edge of the longer plate in the polarizing plate laminate, in which two polarizing plates were arranged in a crossed Nicol state, transmits light and therefore, appears white. Such phenomenon can be easily judged by visual observation. Such phenomenon causes visualization problem in that images at edge portions cannot be observed in such a polarizing plate.

Ratings A, B and C are not problematic for a polarizing plate. Rating D is problematic for practical use. Rating E cannot be put into practical use for a polarizing plate.
A: The length of one edge turning white was less than 5%.
B: The length of one edge turning white was from 5% to less than 10%.
C: The length of one edge turning white was from 10% to less than 20%.
D: The length of one edge turning white was from 20% to less than 50%.
E: The length of one edge turning white was not less than 50%.

The evaluation described above has been made. The inventive polarizing plate samples 1 through 5 provided a transmittance of not more than 45%, and a degree of polarization of not less than 98%. In contrast, the comparative polarizing plate sample 6 provided a transmittance of 5%, and a degree of polarization of 85%. In the durability evaluation, the inventive polarizing plate samples 1 through 3 were rated as A, and the inventive polarizing plate samples 4 and 5 as B, however, the comparative polarizing plate samples 6 and 7 were rated as D.

As is apparent from the above, the inventive polarizing plate samples exhibited excellent durability as compared with the comparative polarizing plate samples.

Example 3
(Preparation of Liquid Crystal Panel and Liquid Crystal Display Sample)

The two polarizing plates were peeled from the both sides of the liquid crystal cell of a commercially available display panel (a color liquid crystal display MultiSync LCD1525J TYPE LA-1529HM, produced by NEC Co., Ltd.). Subsequently, the two of each of inventive polarizing plate samples 1 to 5 and comparative polarizing plate samples 6 and 7 prepared in Example 2 were superposed on the liquid crystal cell so that their polarizing direction was in accordance with the original one to obtain a liquid crystal panel. The resulting liquid crystal panel was installed in the color liquid crystal display, and contrast was visually evaluated. As a result, it has been confirmed that the liquid crystal panel employing the inventive samples maintained a high contrast for a long term as compared with the liquid crystal panel employing the comparative samples.

Effects of the Invention

The present invention can provide a cellulose ester film which has a good moisture vapor transmittance, and excellent dimensional stability, even when it has a reduced thickness. Further, the present invention can provide a method of manufacturing the cellulose ester film, and a polarizing plate and a liquid crystal display each employing the cellulose ester film.

What is claimed is:

1. A cellulose ester film comprising particles in an amount of from 0.0001 to 0.3% by weight and a compound represented by the following formula (1) in an amount of 1 to 30% by weight

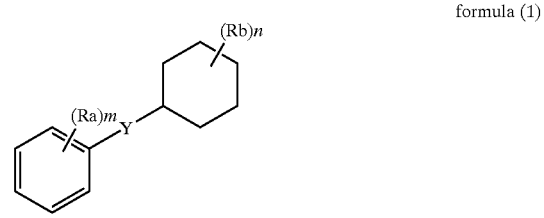

formula (1)

wherein Y represents an ester bond or —R¹C(=O)O—, —C(=O)OR²—, —C(=O)O—R³—OC(=O)— or —OC(=O)—R⁴—C(=O)O—, in which R¹ and R² independently represent a substituted or unsubstituted alkylene group, and R³ and R⁴ independently represent a substituted or unsubstituted alkylene group, or —(R⁵O)$_p$R⁵—, in which R⁵ represents a substituted or unsubstituted alkylene group, and p is an integer of from 1 to 3; Ra and Rb independently represent an alkyl group, RcC(=O)O— or —C(=O)ORc in which Rc represents a substituted or unsubstituted phenyl group or a substituted or unsubstituted cyclohexyl group; and m and n independently represent an integer of from 0 to 5, provided that when m or n is not less than 2, plural Ras or Rbs may be the same or different; and wherein the cellulose ester film has a thickness of from 10 to 60 μm, a moisture vapor transmittance of from 20 to 200 g/m²·24 hr, and a rate of weight change falling within the range of ±2% in which the rate is represented by the ratio of the difference between the film weights before and after storage at 80° C. and 90% RH for 48 hours to the film weight before the storage.

2. The cellulose ester film of claim 1, wherein the unsubstituted alkylene group represented by $R^1$, $R^2$, $R^3$, $R^4$ or $R^5$ represents methylene, ethylene, trimethylene, propylene, tetramethylene, butylenes, pentamethylene or pentylene, and the substituted alkylene group represented by $R^1$, $R^2$, $R^3$, $R^4$ or $R^5$ represents methylene, ethylene, trimethylene, propylene, tetramethylene, butylenes, pentamethylene or pentylene, each having methyl, ethyl, n- or iso-propyl, n-, iso-, or tert-butyl, acetoxy, phenylcarbonyloxy, cyclohexylcarbonyloxy, phenylcarbonyloxymethyl or cyclohexylcarbonyloxymethyl as a substituent.

3. The cellulose ester film of claim 1, wherein the substituent represented by Ra or Rb is RcC(=O)O— or —C(=O)ORc in which Rc represents a substituted or unsubstituted phenyl group or a substituted or unsubstituted cyclohexyl group, and m represents an integer of from 1 to 5, provided that when m is not less than 2, plural Ras may be the same or different.

4. The cellulose ester film of claim 1, wherein the substituent represented by Ra or Rb is RcC(=O)O— or —C(=O)ORc in which Rc represents a substituted or unsubstituted phenyl group or a substituted or unsubstituted cyclohexyl group, and n represents an integer of from 1 to 5, provided that when n is not less than 2, plural Rbs may be the same or different.

5. The cellulose ester film of claim 1, wherein Ra is RcC(=O)O— or —C(=O)ORc in which Rc represents a substituted or unsubstituted cyclohexyl group, and in represents an integer of from 1 to 5, provided that when in is not less than 2, plural Ras may be the same or different.

6. The cellulose ester film of claim 1, wherein the cellulose ester film comprises a UV absorbent having a distribution coefficient of not less than 8.5.

7. The cellulose ester film of claim 1, wherein the particles are silicon oxide particles.

8. The cellulose ester film of claim 1, wherein the cellulose ester film comprises a cellulose ester having a total acyl substitution degree of from 2.55 to 2.85.

9. A method of manufacturing a cellulose ester film according to a solution cast film manufacturing process, the method comprising the steps of casting on a support a cellulose ester solution comprising a compound represented by formula (1) to form a web on the support, drying the web for 30 to 90 seconds on the support, peeling the web from the support, and further drying the peeled web, wherein said cellulose ester film comprising particles in an amount of from 0.0001 to 0.3% by weight and said compound represented by the following formula (1) in an amount of 1 to 30% by weight

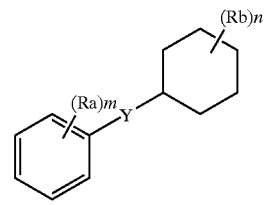

formula (1)

wherein Y represents an ester bond or —$R^1$C(=O)O—, —C(=O)O$R^2$—, —C(=O)O—$R^3$—OC(=O)— or —OC(=O)—$R^4$—C(=O)O—, in which $R^1$ and $R^2$ independently represent a substituted or unsubstituted alkylene group, and $R^3$ and $R^4$ independently represent a substituted or unsubstituted alkylene group, or —($R^5$O)$_p$$R^5$—, in which $R^5$ represents a substituted or unsubstituted alkylene group, and p is an integer of from 1 to 3; Ra and Rb independently represent an alkyl group, RcC(=O)O— or —C(=O)ORc in which Rc represents a substituted or unsubstituted phenyl group or a substituted or unsubstituted cyclohexyl group; and m and n independently represent an integer of from 0 to 5, provided that when m or n is not less than 2, plural Ras or Rbs may be the same or different; and wherein the cellulose ester film has a thickness of from 10 to 60 μm, a moisture vapor transmittance of from 20 to 200 g/m²·24 hr, and a rate of weight change falling within the range of ±2% in which the rate is represented by the ratio of the difference between the film weights before and after storage at 80° C. and 90% RH for 48 hours to the film weight before the storage.

10. The method of claim 9, wherein the cellulose ester film comprises a UV absorbent having a distribution coefficient of not less than 8.5.

11. The method of claim 9, wherein the particles are silicon oxide particles.

12. The method of claim 9, wherein the cellulose ester film comprises a cellulose ester having a total acyl substitution degree of from 2.55 to 2.85.

13. The method of claim 9, wherein the cellulose ester solution contains methyl acetate.

14. A polarizing plate comprising the cellulose ester film of claim 1.

15. A liquid crystal display employing the polarizing plate of claim 14.

16. The cellulose ester film of claim 1, wherein the particles have an average secondary particle size of 0.1 to 1.0 μm.

* * * * *